UNITED STATES PATENT OFFICE.

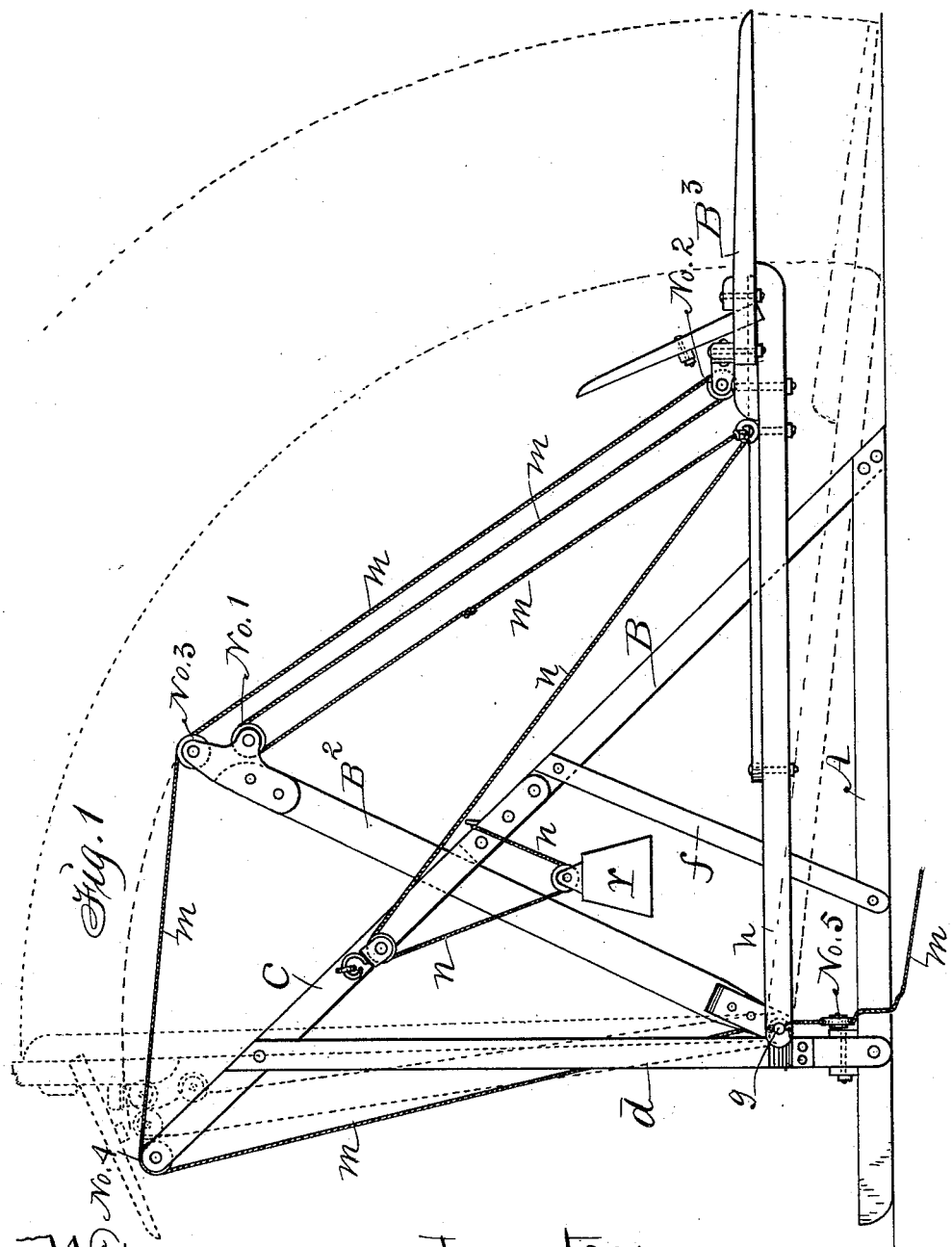

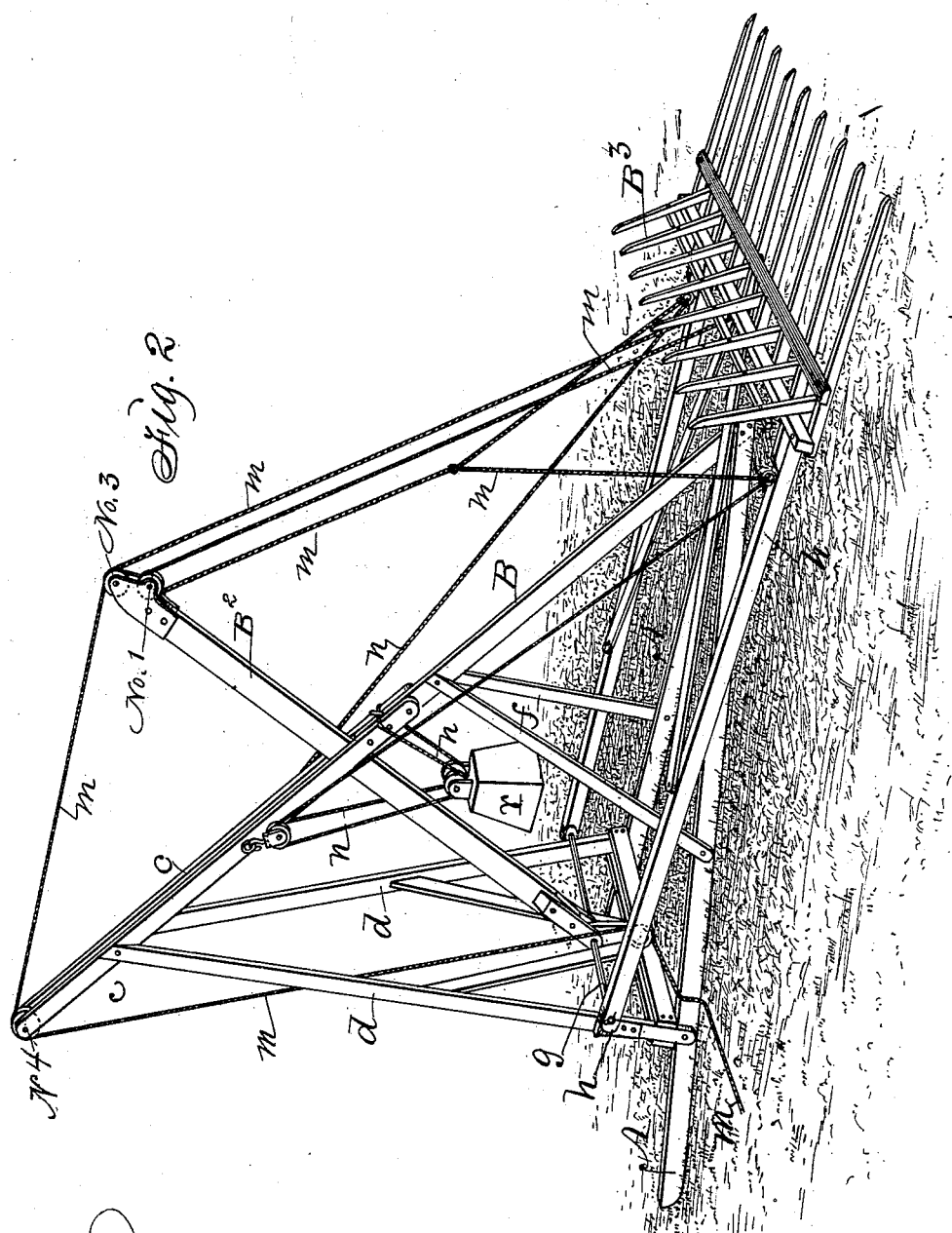

ORBIN F. SMITH, OF OSCEOLA, IOWA.

HAY-STACKER.

SPECIFICATION forming part of Letters Patent No. 424,030, dated March 25, 1890.

Application filed September 1, 1888. Serial No. 284,507. (No model.)

*To all whom it may concern:*

Be it known that I, ORBIN F. SMITH, a citizen of the United States, and a resident of Osceola, in the county of Clarke and State of Iowa, have invented an Improved Hay-Stacker, of which the following is a specification.

Heretofore forks have been hinged to a portable frame in such a manner that they could be loaded with hay while flat upon the ground, and then by means of ropes and pulleys swung upward to elevate the hay.

My improvement relates to this class of machines; and my invention consists in the construction and combination of a portable frame, a hinged post, a hinged fork, and a rope and pulleys for elevating the loaded fork, and a rope and weight and pulleys for balancing the fork and aiding in raising and lowering it, as hereinafter set forth, pointed out in my claims, and illustrated in the accompanying drawings, in which—

Figure 1 is a side view of my machine, showing the hinged fork in a horizontal position, but lifted from the ground. Fig. 2 is a perspective view showing the fork upon the ground and in position as required to drag hay thereon by means of a horse-rake.

A are the side pieces of the triangular-shaped base of the frame fixed to the opposite sides and lower end of a beam B, that extends upward at an angle of about forty-five degrees.

$c$ are wooden bars fixed to the opposite sides of the top end of the beam B in such a manner that they will support a hinged post that extends up between them.

$d$ are braces fixed to the bars $c$ at their top ends and to the side pieces A at their lower ends, and $f$ are braces extending from the same side pieces A to the top portion of the beam B. A rigid and strong frame is thus produced that allows the parallel arms of a hinged fork to be braced in such a manner that the braces will not come in contact with the frame when the fork is operated.

$B^2$ is a post hinged midway between the two braces $d$ and near the bottom of the frame by means of a rod $g$, fixed to said braces, or in any suitable way, so that the post will swing vertically between the bars $c$.

$B^3$ is a fork of common form fixed to the ends of the rod $g$ in such a manner that the fork can be swung up over the beam B and the bars $c$ fixed thereto, as required to elevate and discharge hay over the frame to facilitate building a stack at the end of the frame.

$m$ is a rope that has a forked end fixed to the fork $B^3$, and then extended over a pulley No. 1 near the top of the hinged post $B^2$, from thence down over a pulley No. 2, attached to the center of the fork $B^3$, then up over a pulley No. 3 at the top of the hinged post $B^2$, then down over a pulley No. 4 between the ends of the bars $c$, and from thence down and outward over a pulley No. 5, connected with cross-pieces at the bottom of the frame. By means of the movable pulleys thus carried on the fork and the hinged post the rope is doubled in such a manner that it requires less power to lift the loaded fork to the top of the frame than when there is no movable pulley.

$n$ is a rope doubled at its center across the top portion of the beam B, and then passed under parallel pulleys attached to the top of a weight $r$, and from thence over pulleys attached to the central portions of the bars $c$, and then down and fastened to the parallel arms that carry the fork $B^3$ in such a manner that the weight will balance the fork and facilitate its operation.

In the practical use of my hay-stacker a horse is hitched to the free end of the rope $m$ to elevate the fork when it is loaded with hay and to throw the hay over the top of the frame and upon a stack built at the end of the frame. By means of the movable pulley No. 2 the power applied by the horse will be doubled until the fork comes in contact with the top of the hinged post, upon which it will then be supported and moved with increased speed, as required to throw the hay off the fork and over the frame.

I claim as my invention—

1. In a hay-stacker, the combination of a hinged post carrying pulleys at its top end, a hinged fork, and a rope and pulleys, with a frame, to operate in the manner set forth, for the purposes stated.

2. A frame composed of base-pieces A, a beam B, having fixed bars $c$ and braces $d$ and $f$, a post $B^2$, carrying pulleys Nos. 1 and 3, a fork $B^3$, having fixed parallel arms $h$, and a pulley No. 2, a rope $m$, and pulleys Nos. 4 and 5, arranged and combined substantially as shown and described, for the purposes stated.

3. A hay-stacker comprising a frame of triangular shape at its base, a beam extending upward from the point of the base at an angle of about forty-five degrees, an extension at the top of the beam adapted to guide and support a hinged post, braces extending from the base to the beam, a post hinged to the frame, a fork having parallel arms hinged to the frame, a rope and pulley for elevating the fork, a rope and weight and pulleys for balancing the fork, constructed and combined to operate in the manner set forth, for the purposes stated.

ORBIN F. SMITH.

Witnesses:
CHAS. ISRAEL,
ELMER E. KELLEY.